United States Patent [19]

Shintani et al.

[11] Patent Number: 5,695,663

[45] Date of Patent: Dec. 9, 1997

[54] PLASMA CUTTING METHOD AND NC PLASMA CUTTING APPARATUS

[75] Inventors: Toshiya Shintani, Chigasaki; Yutaka Nakau, Kawasaki, both of Japan

[73] Assignee: Kabushiki Kaisha Komatsu Seisakusho, Tokyo, Japan

[21] Appl. No.: 505,310

[22] PCT Filed: Feb. 23, 1994

[86] PCT No.: PCT/JP94/00271

§ 371 Date: Aug. 16, 1995

§ 102(e) Date: Aug. 16, 1995

[87] PCT Pub. No.: WO94/19138

PCT Pub. Date: Sep. 1, 1994

[30] Foreign Application Priority Data

Feb. 25, 1993 [JP] Japan ................... 5-060862

[51] Int. Cl.⁶ .............................. B23K 10/00
[52] U.S. Cl. .................. 219/121.44; 219/121.39; 219/121.54; 219/121.59; 219/124.21
[58] Field of Search .............. 219/121.39, 121.44, 219/121.54, 121.57, 121.59, 124.21

[56] References Cited

U.S. PATENT DOCUMENTS 5,043,554  8/1991  Kohsaka et al. ............... 219/121.39
5,225,658  7/1993  Yamaguchi et al. ............ 219/121.57

FOREIGN PATENT DOCUMENTS 61-63366   4/1986   Japan .
63-5875    1/1988   Japan .
0241379    9/1989   Japan ................... 219/121.44
1-165171   11/1989  Japan .
3297575    12/1991  Japan ................... 219/121.44
4-9637     2/1992   Japan .

OTHER PUBLICATIONS

Japan Welding Association "Basis and Practise of Plasma Arc Cutting" 1st edit, Dec. 1, 1983, Kosaido Co., Ltd.

Primary Examiner—Mark H. Paschall
Attorney, Agent, or Firm—Sidley & Austin

[57] ABSTRACT

The present invention relates to a plasma cutting method and an NC plasma cutting apparatus in which an improvement can be made in the quality of a bore-cut product obtained by using a transferred plasma arc, and the productive efficiency can also be enhanced. In order to achieve the above-described advantages, the transferred plasma arc is switched to a non-transferred plasma arc at a position immediately before a cutting finishing point and in the vicinity of a position at which cutting lines cross each other. Simultaneously with this switching operation, the moving speed of the plasma torch is varied in accordance with a change in the plasma arc current. Additionally, the transferred plasma arc current is reduced at a position immediately before the cutting finishing point and in the vicinity of a position at which cutting lines cross each other. The moving speed of the plasma torch can be varied in accordance with the reduction in the arc current. Further, the above-described voltage detecting function is kept in the off state during a cutting operation, and it is actuated at a position immediately before the cutting finishing point and in the vicinity of a position at which cutting lines cross each other.

22 Claims, 6 Drawing Sheets

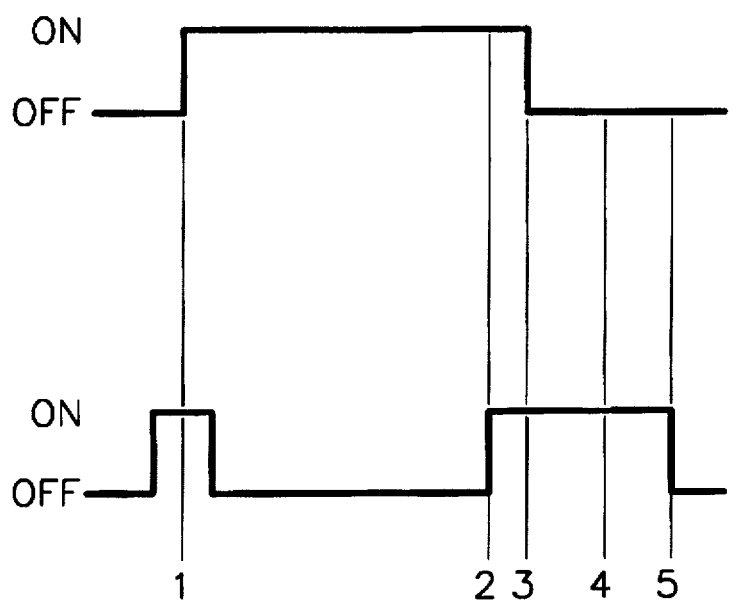
FIG. 1A TRANSFERRED PLASMA ARC
FIG. 1B NON-TRANSFERRED PLASMA ARC
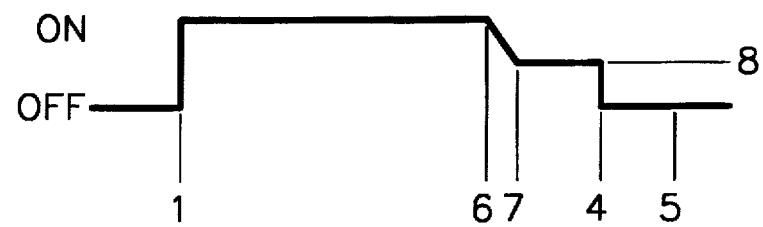
FIG. 2
TRANSFERRED PLASMA ARC CURRENT

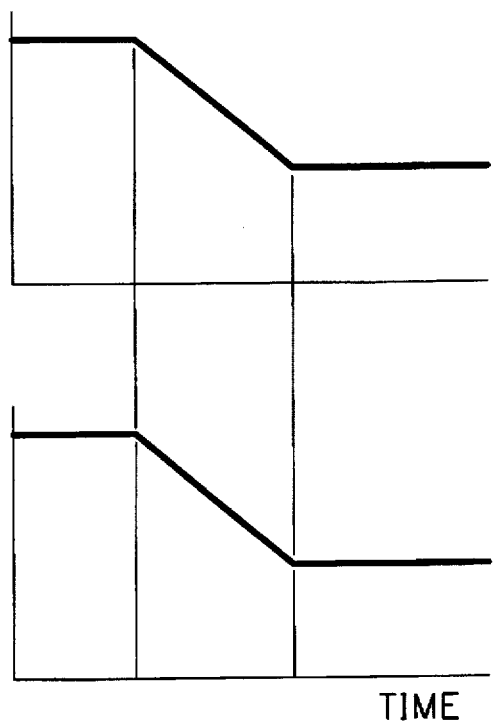
FIG. 3A
TRANSFERRED PLASMA ARC CURRENT
FIG. 3B
MOVING SPEED OF PLASMA TORCH
TIME
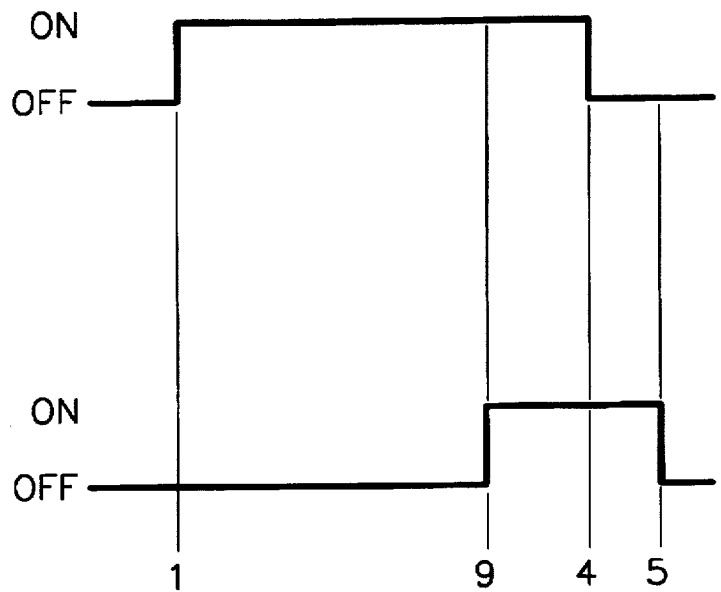
FIG. 4A
TRANSFERRED PLASMA ARC CURRENT
FIG. 4B
ARC VOLTAGE DETECTION DEVICE

PLASMA CUTTING METHOD AND NC PLASMA CUTTING APPARATUS

TECHNICAL FIELD

The present invention relates to a plasma cutting method and an NC plasma cutting apparatus. More particularly, the invention relates to a plasma cutting method and an NC plasma cutting apparatus best suited to cutting a workpiece by generating a transferred plasma arc.

BACKGROUND ART

Hitherto, a plasma cutting method has been widely employed as a processing method for cutting plate workpieces, such as iron, stainless steel, aluminum and the like, at high speed. Plasma cutting apparatuses used for this method are classified into a transferred type and a non-transferred type, depending on the method of generating a high-temperature plasma arc. A typical non-transferred plasma cutting apparatus, as schematically shown in FIG. 6, comprises an electrode 11 disposed at the center of a plasma torch and a funnel-shaped nozzle 12 which is placed to surround the forward end of the electrode 11 across a plasma gas passage and which has an opening at the forward end thereof. Both the electrode 11 and the nozzle 12 are connected to the output terminal of a power supply source 16. With this construction, during a cutting operation, an arc discharge is generated between the electrode 11 and the nozzle 12 while a plasma gas is allowed to flow therebetween. The plasma gas is thus transformed into the state of high-temperature plasma, and at the same time, a non-transferred plasma jet 13 is ejected through the opening formed at the forward end of the nozzle 12 toward a workpiece 14 to be cut, thereby melting and cutting the workpiece 14. This non-transferred plasma cutting apparatus is advantageous in that the workpiece 14 can be cut by this apparatus whether it is formed of an electrically-conductive material or a non-conductive material. However, the apparatus presents a problem in that it incurs a greater loss of the nozzle and has a heat efficiency as low as approximately 20%.

On the other hand, a typical transferred plasma cutting apparatus, as schematically shown in FIG. 7, is basically constructed in a manner similar to the non-transferred plasma cutting apparatus. That is, the transferred plasma cutting apparatus comprises an electrode 11 and a nozzle 12, with each of the electrode 11, the nozzle 12, and the workpiece 14 to be cut being connected to an output terminal of the power supply source 16.

A description will now be given of a cutting operation of the apparatuses constructed as described above. At the start of the operation, as illustrated in FIG. 6, arc discharge is effected between the electrode 11 and the nozzle 12 so that a non-transferred plasma jet 13 is ejected from the opening of the nozzle, thus generating a pilot arc. When this plasma jet 13 reaches the workpiece 14, electrical conductivity can be obtained between the electrode 11 within the torch and the workpiece 14. Subsequently, as illustrated in FIG. 7, a current flows between the electrode 11 and the workpiece 14, and simultaneously, the nozzle 12 and the power supply source 16 are disconnected so that the pilot arc can be extinguished, and a transferred plasma jet 15 can be formed. The starting operation of the transferred plasma arc is thus completed.

Upon completion of the starting operation, the transferred plasma jet 15 starts to cut the workpiece 14. For achieving high performance of cutting, the plasma arc current applied during the cutting operation is set as the optimum value in consideration of various conditions, such as the shape of the plasma torch, the type of plasma gas, the type and the thickness of the workpiece to be cut, cutting speed and other conditions. The power supply source 16 is controlled so that this optimum current value can be maintained. In general, this plasma arc current is set to be constant without being changed until the cutting operation is completed. In contrast, when a cutting operation is performed on a workpiece having the shape of a small circular arc or an acute angle in cross-section, it is required that the speed of a torch moving device be decreased for preventing vibration of the torch moving device and ensuring locus precision. For achieving these requirements, it is known that the following measures are taken. The plasma arc current is reduced in accordance with a decrease in the moving speed of the torch, thus preventing excessive heat from being transferred to the workpiece, thereby obtaining good cutting quality, in particular, the cutting quality exhibiting good appearance of corner portions (for example, refer to Japanese Utility Model Laid-Open No. 1-165171).

Then, upon completion of the cutting operation, the transferred plasma arc current is interrupted, generally at a cutting finishing point. After the current interruption, the generation of heat required for performing the cutting operation is terminated, and the workpiece stops melting, thus completing the cutting operation.

On the other hand, the following technique is known in contrast to the above-described cutting method. Upon completion of the cutting operation, the non-transferred pilot arc is ignited before the transferred plasma arc is extinguished so that the above-described pilot arc can be maintained at the cutting finishing point even after the transferred plasma arc has been extinguished, thus enabling speedy starting of a subsequent cutting operation (for example, refer to Japanese Patent Laid-Open No. 63-5875 and Japanese Patent Publication No. 4-9637).

The typical transferred plasma cutting operation has thus been explained as described above. A higher heat efficiency of approximately 80% can be achieved by use of this method. Accordingly, this method is often employed in the metal processing field in which a workpiece is formed of a good conducting material.

When a cutting operation is performed by the transferred plasma arc, for example, when a bore-cutting operation is performed on a metal workpiece to make a hole therein in the shape of a circle, ellipse, rectangle or the like, the cutting operation is generally performed according to a locus shown in FIG. 8. Referring to FIG. 8, reference numeral 24 denotes a cutting line; 21 indicates a cutting starting point; and 22 designates a cutting finishing point. The cutting operation is started by generating a transferred plasma arc at the cutting starting point 21, and then, the cutting operation is performed along the cutting line 24, followed by interrupting the transferred plasma arc current at the cutting finishing point 22, thus accomplishing the cutting operation. The reason that the cutting finishing point 22 is not set at a crossing point 23 on the cutting line 24 will be given below. If the cutting finishing point 22 is set at the crossing point 23, it is necessary to precisely provide timing for the movement of the plasma torch and the interruption of the arc current. If the arc current is interrupted too early, the workpiece is left partially uncut. In order to avoid this disadvantage, the cutting line 24 is extended inwardly toward the hole so that a reliable cutting operation can be ensured.

However, in the above-described bore-cutting operation, when the size of a hole to be cut is small, a workpiece scrap 25 is frequently dropped without being held by a workpiece-supporting portion of the cutting apparatus. This causes a discharge point of the transferred plasma arc to remain on the inner surface of the hole formed in a product 26, as illustrated in FIG. 9. This arc discharge continues until the discharge arc is naturally extinguished due to the subsequent movement of the plasma torch. More specifically, the plasma torch is moved away from the inner surface of the hole so as to cause an increase in the arc voltage, which makes it impossible to maintain discharging. Accordingly, until the arc discharge is extinguished, the inner surface of the hole is heated by the arc discharge, and also, it is likely that a double arc will be generated. This increases the degree of melting, burning or the like, occurring on the inner surface of the hole formed in the product 26, which further causes a problem of a deterioration in the cutting quality.

The following measure is known to solve the above-described problem. Examination has been made on the arc voltage which is changed during the cutting operation depending on various conditions, such as the arc current value, the gas pressure, the cutting speed, and other conditions. A set value of the arc voltage has then been determined. Thus, taking advantage of an increase in the arc voltage after the above-described workpiece scrap has been dropped, the plasma arc current is interrupted when the voltage exceeds the set value, thus shortening the duration of discharging applied to the workpiece. With this arrangement, a deterioration in the cutting quality can thus be effectively inhibited (for example, Japanese Patent Laid-Open No. 1-241379).

However, in this method of taking advantage of the cutting arc voltage, it is necessary to predict a change in the voltage, such as an increase in the arc voltage depending on the cutting shape of, for example, a small circular arc, an acute angle, or the like. Additionally, for preventing a stoppage of the cutting operation with respect to the arc voltage, it is necessary that a somewhat higher set value be determined. Because of these requirements, it will take a longer time to interrupt the plasma arc current, whereby it is likely that the burning will be left on the cutting surface.

SUMMARY OF INVENTION

Accordingly, in order to overcome the above-described drawbacks inherent in the prior art, an object of the present invention is to provide a plasma cutting method and an NC plasma cutting apparatus in which an improvement can be made in the quality of the working surface in the vicinity of the cutting finishing point when a cutting operation is performed by use of a transferred plasma arc.

According to a first aspect of the present invention, there is provided a plasma cutting method for switching from a transferred plasma arc to a non-transferred plasma arc at a position immediately before a cutting finishing point and in the vicinity of a position at which cutting lines cross each other. Also, simultaneously with the switching operation to the non-transferred plasma arc, a moving speed of a plasma torch can be varied in accordance with a change from a transferred plasma arc current to a non-transferred plasma arc current.

With this construction, even when a workpiece scrap is separated and dropped from a cut hole formed in a workpiece, a discharge point hardly remains in the resultant product. This can prevent a larger amount of heat than is necessary from being transferred to the product, thus obtaining a cutting surface of good quality. Further, the moving speed of the plasma torch can be varied, for example, the moving speed can be decreased to compensate for the lower heat efficiency of the non-transferred plasma arc, thus attaining suitable cutting capability.

According to a second aspect of the present invention, there is provided a plasma cutting method for reducing a transferred plasma arc current at a position immediately before a cutting finishing point and in the vicinity of a position at which cutting lines cross each other. Also, simultaneously with reducing the transferred plasma arc current, a moving speed of a plasma torch can be varied in accordance with the reduction in the current.

With this construction, even though a discharge point remains in the resultant product when a workpiece scrap is separated and dropped from a cut hole, the discharge point exhibits only a small plasma arc current, thus decreasing the heating value. Consequently, the product can be inhibited from melting, which further minimizes a deterioration in the quality of the cutting surface. In accordance with the aforementioned advantage, a decrease in the moving speed or the like can be realized to compensate for a reduction in the heating value due to a decrease in the plasma arc current, thereby attaining suitable cutting capability.

According to a third aspect of the present invention, there is provided a plasma cutting method in which a function of detecting the voltage is kept in the off state during a cutting operation and is actuated at a position immediately before a cutting finishing point and in the vicinity of a position at which cutting lines cross each other. Also, a function of interrupting the plasma arc current can instead be kept in the off state during the cutting operation and actuated at the above-described position.

With this arrangement, it becomes possible to set a suitable voltage required for interrupting the arc current, without having the necessity of considering a change in the arc voltage caused by various factors during the cutting operation until reaching a position immediately before the cutting finishing point. This eliminates the necessity of setting an actual voltage higher than a suitable voltage, which conventionally has been necessary. Hence, it becomes possible to shorten the time required from dropping a workpiece scrap until the arc current is interrupted, thereby decreasing the heating value at a discharge point remaining in the resultant product, resulting in good quality of the cutting surface. With this method, it is possible to achieve the object more accurately, in comparison with a method of interrupting the arc current by detecting an increase in the arc voltage (for example, the above-discussed Japanese Patent Laid-Open No. 1-241379). Also, the plasma arc current interrupting function can be applied, in which case, operations and advantages similar to those obtained by the voltage detecting function can be attained.

According to a fourth aspect of the present invention, there is provided an NC plasma cutting apparatus comprising means for inputting, in advance into a control program, data concerning a position immediately before a cutting finishing point and at which cutting lines cross each other; means for detecting, during a cutting operation, that the position which has been inputted into the control program has nearly been reached; and means for giving an instruction, based on the result of the detection, for performing the cutting operation which should be executed. The instruction means can be means for giving an instruction, based on the result of the detection, for switching from a transferred plasma arc to a non-transferred plasma arc. Alternatively, the instruction means can be means for giving the switching instruction and also for giving an instruction for varying a moving speed of a plasma torch in accordance with a change from a transferred plasma arc current to a non-transferred plasma arc current. Further, the instruction means can be means for giving an instruction, based on the result of the detection, for reducing a transferred plasma arc current. Alternatively, the instruction means can be means for giving the current-reducing instruction and also giving an instruction for varying a moving speed of a plasma torch in accordance with the current reduction. Further, the instruction means can be means for giving an instruction, based on the result of the detection, for allowing a voltage detecting function to be kept in the off state during the cutting operation and for actuating the function at the position immediately before the cutting finishing point and in the vicinity of the position at which the cutting lines cross each other. Alternatively, the voltage detecting function can be substituted by a plasma arc current interrupting function.

With this arrangement, it is possible to obtain an NC plasma cutting apparatus which makes changes to the proceeding cutting operation at a position immediately before the cutting finishing point and in the vicinity of a position at which cutting lines cross each other, such a position being instructed by the program. By use of this apparatus, a series of procedures of cutting processing can be automatically performed, and at the same time, the quality of cut products can also be improved. Further, in combination with the instruction means, the cutting processing can be performed to satisfy a demanded cutting quality without requiring complicated and troublesome operations.

BRIEF DESCRIPTION OF DRAWINGS

FIGS. 1A and 1B show a timing chart of a transferred plasma arc and a non-transferred plasma arc according to a first aspect of the present invention;

FIG. 2 is a timing chart of a transferred plasma arc current according to a second aspect of the present invention;

FIGS. 4, 4A an 4B show timing charts of a transferred plasma arc current and an arc voltage detection device according to a third aspect of the present invention;

BEST MODE FOR CARRYING OUT THE INVENTION

A detailed description will now be given of a preferred embodiment of a plasma cutting method according to a first aspect of the present invention with reference to the accompanying drawings.

Figure 8:
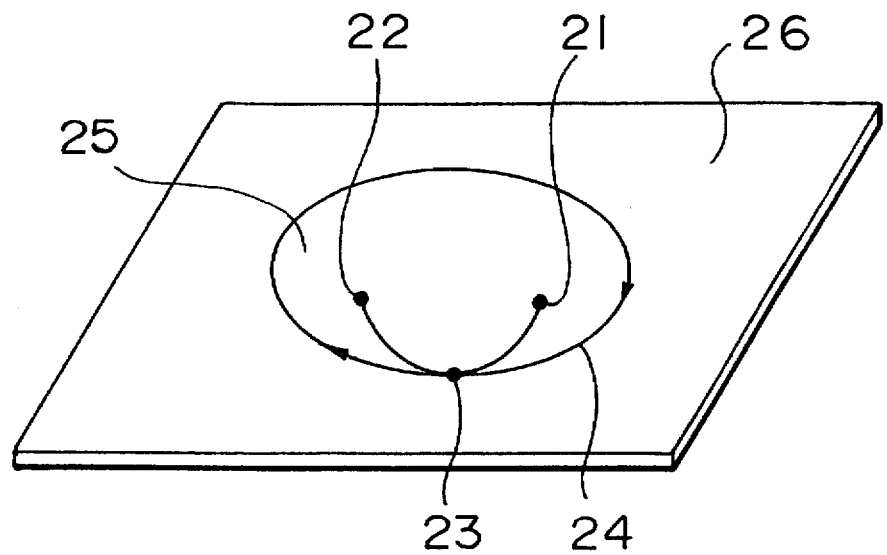
FIG. 8 is a schematic view showing an example of a locus of a typical bore-cutting operation.
Figure 9:
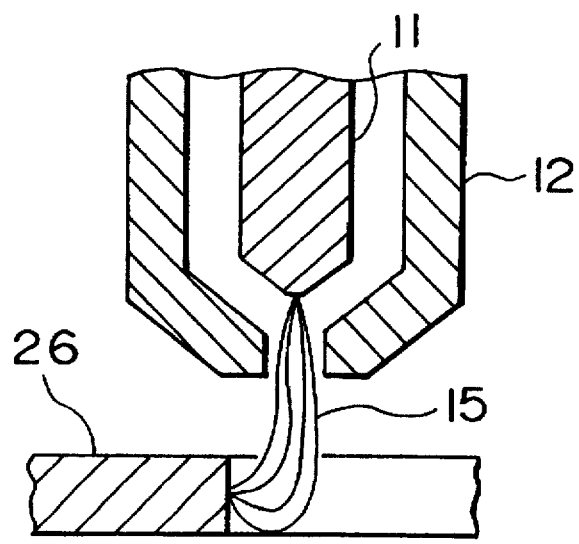
FIG. 9 shows that a bore-cutting operation is completed by use of a transferred plasma arc cutting apparatus according to a conventional art.

FIG. 1 is a timing chart of this embodiment and shows a cutting starting point 1, an ignition point 2 of a non-transferred plasma arc, an extinguishing point 3 of a transferred plasma arc, a bore-cutting finishing point 4 and a cutting finishing point 5. This embodiment employs an NC plasma cutting apparatus of the type which performs a cutting operation based on a control program having normal cutting information and cutting conditions shown in FIG. 1 inputted therein. By use of this apparatus, a cutting operation is performed according to a locus of a typical bore-cutting operation on a metal workpiece. This embodiment will be described with reference to FIGS. 1 and 8. In a manner similar to a typical cutting operation, the non-transferred plasma arc is ignited and extinguished so as to generate the transferred plasma arc at the position indicated by reference numeral 1 corresponding to the cutting starting point 21, thereby starting the bore-cutting operation. The cutting operation is performed along a cutting line 24 by the transferred plasma arc. Reference numerals 2 and 3 are set so that the cutting-proceeding position can be located in the vicinity of the crossing point 23 on the cutting line 24. More specifically, the cutting-proceeding position is more preferably located at a position immediately before the crossing point 23 when high precision is demanded for a cutting operation. On the other hand, the cutting-proceeding position is more preferably located at a position immediately after passing through the crossing point 23 when it is desired that the cutting speed take priority over precision. When the reference numerals 2 and 3 are set at a position immediately before the crossing point 23, the plasma torch, which has run generally one round along the cutting line 24, ignites the non-transferred plasma arc and at the same time, extinguishes the transferred plasma arc at a position immediately before the crossing point 23, thereby switching from the transferred plasma arc to the non-transferred plasma arc. After this switching operation, the plasma torch reaches the crossing point 23, which corresponds to reference numeral 4, on the cutting line 24 in a short time, thus accomplishing the bore-cutting operation. Accordingly, the cutting operation is performed by the non-transferred plasma arc during the interval between the positions indicated by reference numerals 3 and 4, i.e., the locus from immediately before the crossing point 23 to the crossing point 23. Subsequently, at a position indicated by reference numeral 5 corresponding to the cutting finishing point 22, an interruption signal is transmitted to a plasma supply source so that the non-transferred plasma arc is extinguished, thus accomplishing the cutting operation. It is not essential to provide a locus from the crossing point 23 at which the bore-cutting operation is actually finished to the cutting finishing point 22. Such an extra locus is, however, effective for ensuring a proper bore-cutting operation. In the non-transferred plasma arc, discharging occurs between the electrode and the nozzle of the plasma torch. Accordingly, it is operable even when there is no workpiece to be cut under the plasma torch, that is, when the workpiece scrap 25 is separated and dropped from the product 26. In the manner described above, the product 26 obtained by this embodiment does not leave any trace of a discharging point in the cut hole formed in the product 26 even when the workpiece scrap is dropped from the cut hole. It is thus possible to obtain a cutting surface of high quality.

A detailed explanation will now be given of a preferred embodiment of the plasma cutting method according to a second aspect of the present invention with reference to the accompanying drawings.

FIG. 2 is a timing chart of this embodiment. This embodiment employs an NC plasma cutting apparatus having cutting conditions shown in FIG. 2 inputted into a control program. By use of this apparatus, a bore-cutting operation is performed on a metal workpiece along a locus shown in FIG. 8 by virtue of a transferred plasma arc. This embodiment will be explained with reference to FIGS. 2 and 8. First of all, the transferred plasma arc is generated at a position indicated by reference numeral 1 by use of the non-transferred plasma arc (not shown), thereby starting the bore-cutting operation from the cutting starting point 21. The operation is performed along the cutting line 24. Reference numerals 6 and 7 are set so that the cutting-proceeding position can be located in the vicinity of the crossing point 23, and more preferably, at a position immediately before the crossing point 23. During the interval between reference numerals 6 and 7, the transferred plasma arc current at a point indicated by 6 is reduced to such a degree as to reach a level of the current indicated by reference numeral 8. In the state of the plasma arc with the reduced current, in a short time the plasma torch reaches the crossing point 23, which is the bore-cutting finishing point, corresponding to reference numeral 4, thus accomplishing the bore-cutting operation. The reason that the transferred plasma arc is extinguished from the bore-cutting finishing point indicated by 4 onward will be given below. In the transferred plasma arc in which arc discharging occurs between the electrode within the plasma torch and a workpiece to be cut, there is an increase in the voltage when a workpiece scrap is dropped, whereby the transferred plasma arc is unable to be maintained. It is needless to say, however, that the input timing chart can be modified in such a manner that the transferred plasma arc is not extinguished at the position indicated by 4, and instead, the cutting operation is continued at a level of the current indicated by 8, and the transferred plasma arc is extinguished at the position indicated by 5 corresponding to the cutting finishing point 22, thus accomplishing the cutting operation. In such a case, the transferred plasma arc is often naturally extinguished before reaching the cutting finishing point 22 due to an increase in the arc voltage.

In the manner described above, the current of the transferred plasma arc is reduced immediately before the crossing position 23 on the cutting line 24 so that only a small amount of current flows at a discharge point which remains in the product even when the workpiece scrap is separated and dropped from a hole formed by the cutting operation. Hence, only a very small trace of discharging is left, and thus, it is possible to maintain the high quality of the cutting surface of the product.

Figure 3:
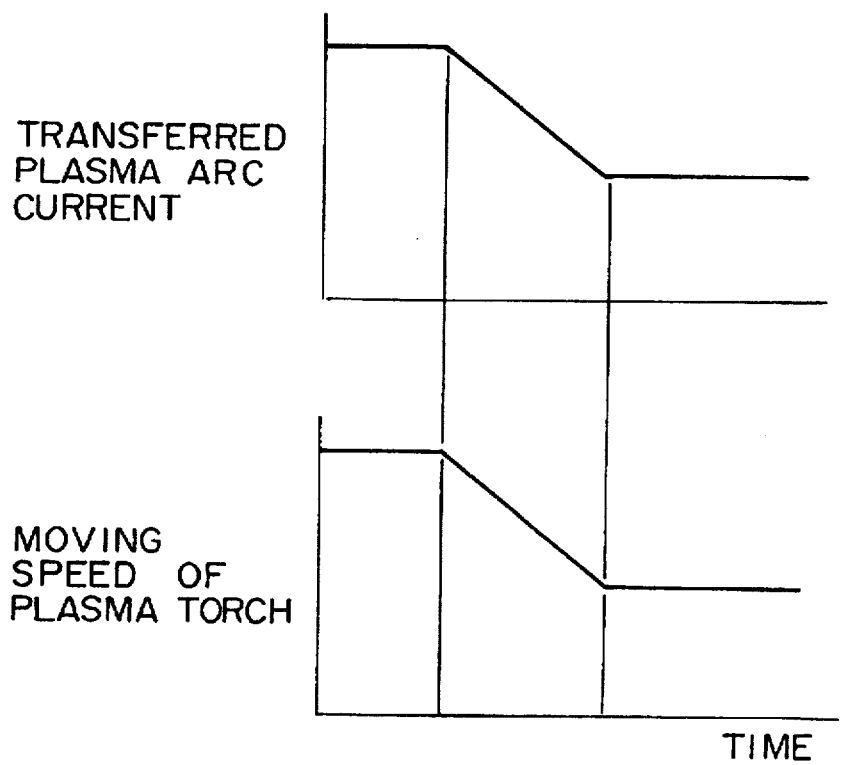
FIGS. 3A and 3B show partial timing charts of a transferred plasma arc current and the moving speed of a plasma torch of another embodiment according to the second aspect of the present invention.

In contrast to the cutting operation performed by reducing the transferred plasma arc current in the above-described embodiment, a description will further be given of an embodiment in which the moving speed of the plasma torch is varied in accordance with the reduction in the transferred plasma arc current. FIG. 3 shows one example of a timing chart of the time interval between reference numerals 6 and 7 shown in FIG. 2 illustrating the previous embodiment. In this embodiment, the transferred plasma arc current is reduced, and simultaneously, the moving speed of the plasma torch is decreased in accordance with this change in the current. With this arrangement, even when the cutting capability is changed due to a change in the plasma arc current, suitable cutting conditions can be obtained by varying the moving speed of the torch, and more preferably, by decreasing the moving speed, thus obtaining better quality of the cutting surface.

In the embodiment according to the first aspect of the present invention, as well as this embodiment, advantages similar to those obtained in this embodiment can be realized by the following process, which is more preferable. That is, the transferred plasma arc is switched to the non-transferred plasma arc, and simultaneously, the moving speed of the plasma torch is changed, and more specifically, the moving speed is decreased, in accordance with the switching from the transferred plasma arc current to the non-transferred plasma arc current.

A detailed description will now be given of a preferred embodiment of a plasma cutting method according to a third aspect of the present invention with reference to the accompanying drawings.

Figure 4:
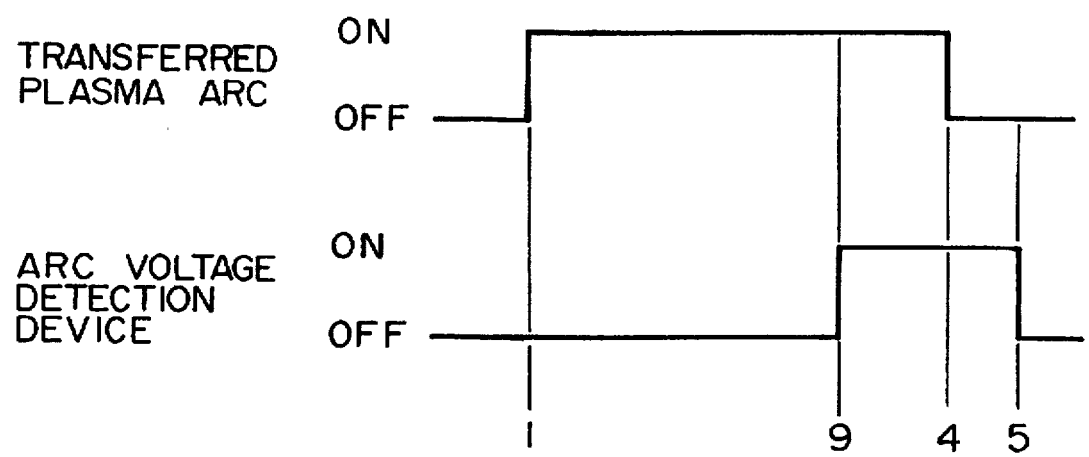

FIG. 4 is a timing chart of this embodiment. This embodiment employs an NC plasma cutting apparatus provided with an arc voltage detection device for detecting a voltage of a transferred plasma arc and interrupting a plasma arc current when the detected voltage exceeds a set value (for example, a device disclosed in the above-described Japanese Patent Laid-Open No. 1-241379). By use of this apparatus, a bore-cutting operation is performed on a metal workpiece along the locus shown in FIG. 8. This embodiment will be explained with reference to FIGS. 4 and 8. First of all, a transferred plasma arc is generated at a position indicated by reference numeral 1 by a non-transferred plasma arc, thereby starting a bore-cutting operation from the cutting starting point 21. The cutting operation is performed along the cutting line 24. From the start of the cutting operation, the voltage detecting function of the arc voltage detection device has been turned off, that is, is inoperable. Subsequently, the voltage detecting function of the arc voltage detection device is actuated at a position indicated by reference numeral 9, that is, at a position immediately before the crossing point 23 of the cutting lines. With this arrangement, it becomes possible to set a suitable voltage required for interrupting the arc current to complete a cutting operation, regardless of a change in the arc voltage caused by various factors during the cutting operation, which further eliminates the necessity of setting an actual voltage higher than a suitable voltage, which conventionally has been necessary. This can shorten the time required from the dropping of the workpiece scrap 25 until the arc current is interrupted, thereby minimizing any trace of a discharge point left in a resultant product. It should be noted that the timing chart can be modified in a manner described below. The transferred plasma arc might not be extinguished at a position indicated by reference numeral 4, which is the bore-cutting finishing point corresponding to the crossing point 23 on the cutting line 24, and instead, the cutting operation might be continued while the transferred plasma arc is kept in the ignition state. Then, the plasma arc can be extinguished at a position indicated by reference numeral 5 corresponding to the cutting finishing point 22, thus accomplishing the cutting operation. Additionally, in place of the voltage detecting function provided with the arc voltage detection device, a plasma arc current interrupting function provided with the arc voltage detection device can be employed. In such a case, operations and advantages similar to those obtained by the foregoing embodiments can be attained.

A detailed explanation will now be given of a preferred embodiment of an NC plasma cutting apparatus according to a fourth aspect of the present invention with reference to the accompanying drawings.

Figure 5:
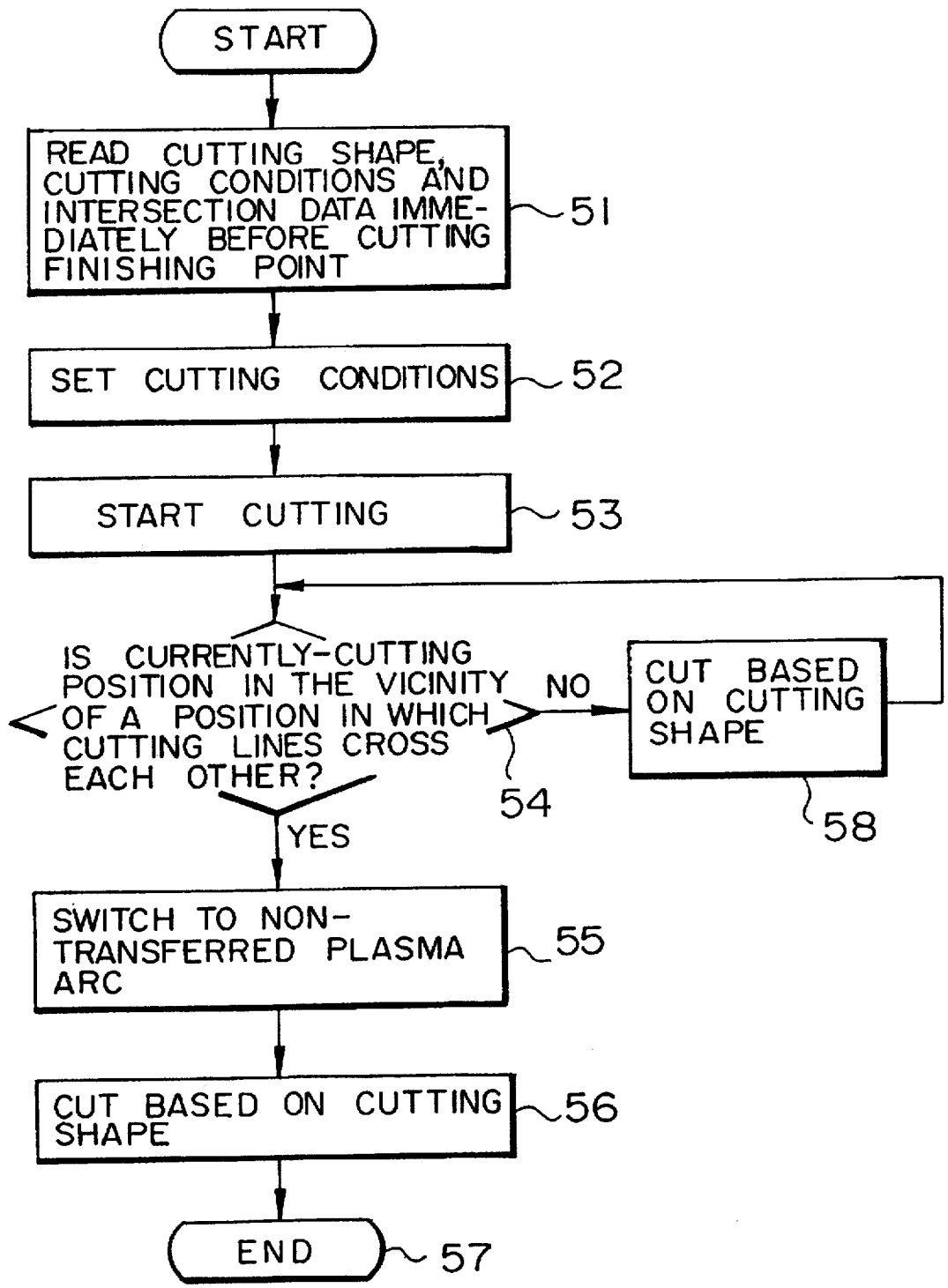
FIG. 5 is a flow chart in which control is executed over an NC plasma cutting apparatus according to a fourth aspect of the present invention.
Figure 6:
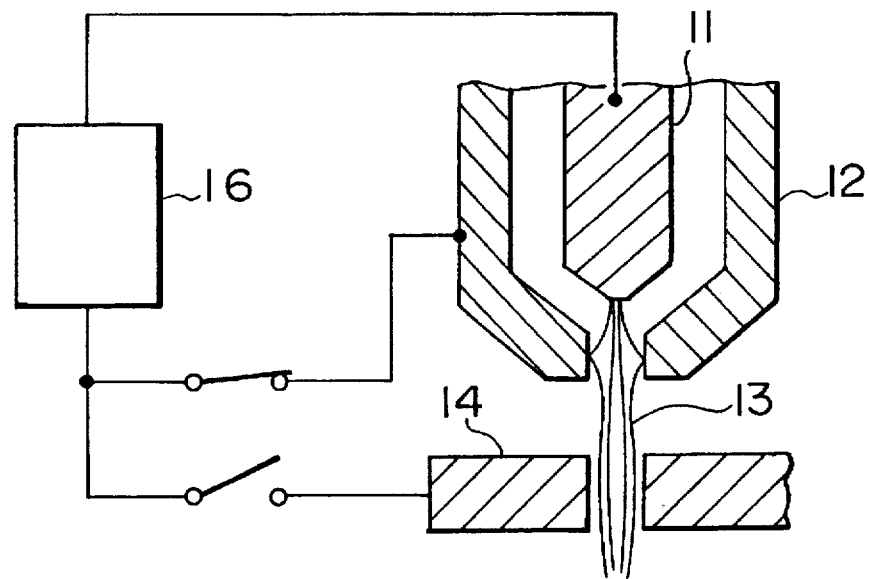
FIG. 6 is a schematic view illustrative of the operation of a typical non-transferred plasma arc cutting apparatus according to a conventional art.
Figure 7:
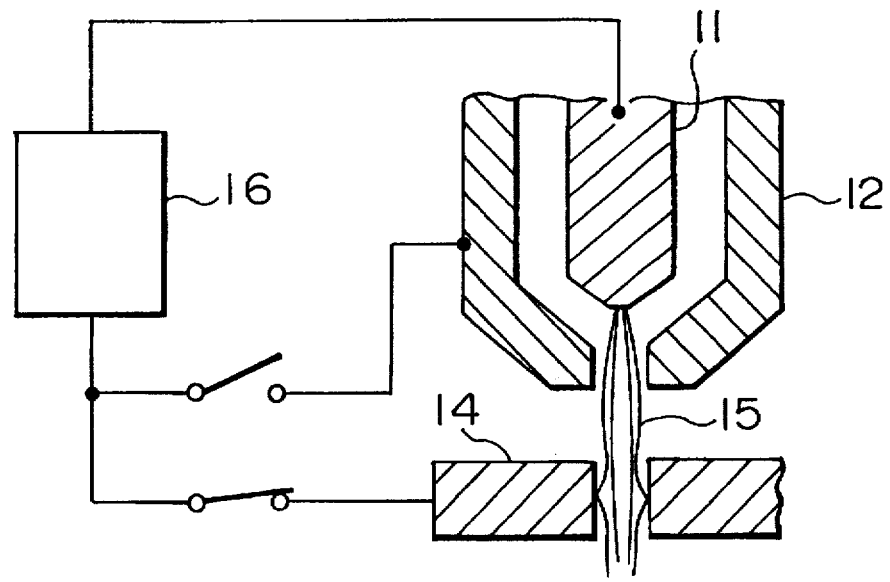
FIG. 7 is a schematic view illustrative of the operation of a typical transferred plasma arc cutting apparatus according to a conventional art.

FIG. 5 is a schematic flow chart illustrative of one embodiment in which control is executed over an NC plasma cutting apparatus, and more specifically, a flow chart having a program in which a transferred plasma arc is switched to a non-transferred plasma arc at a position immediately before a cutting finishing point and in the vicinity of a crossing point of cutting lines. This apparatus is similar to typical NC plasma cutting apparatuses in that a cutting operation is performed along a cutting shape from a cutting starting point based on the inputted program.

In step 51, data concerning a cutting shape, the cutting conditions, and a crossing point at a position immediately before the cutting finishing point are first read. The cutting conditions are set in step 52, and a cutting operation is started in step 53. Subsequently, in step 54, it is determined whether a position at which the cutting operation is currently proceeding matches the data on the position in the vicinity of the crossing point of the cutting lines and the position immediately before the cutting finishing point. The data on the crossing point on the cutting lines can be represented by coordinates, by way of example. Also, a determination of whether a position at which the cutting operation is currently proceeding is near the above-described coordinates can be made by means such as determining whether such a position is located in a region of being with a predetermined distance away from the coordinates. When it is determined that the position at which the cutting operation is currently proceeding is located in the vicinity of the crossing point 23, the flow proceeds to step 55 in which the transferred plasma arc is switched to the non-transferred plasma arc. The cutting operation is started again based on the cutting shape (step 56). When the cutting finishing point 22 is reached, the power supply source is turned off in step 57, thus accomplishing the cutting operation. On the other hand, when it is determined in step 54 that the currently-cutting position is not located in the vicinity of the crossing point of the cutting lines, the flow proceeds to step 58 in which the cutting operation is continued based on the cutting shape, and then, the flow returns to step 54. According to the process discussed above, even when a workpiece scrap is separated and dropped from the cut hole, a trace of a discharge point is not left on the cut hole formed in the resultant product, thereby obtaining a cutting surface of good quality.

Although the switching operation from the transferred plasma arc to the non-transferred plasma arc is performed in step 55 in this embodiment, the foregoing plasma cutting method according to the present invention can instead be inputted in step 55. For example, the below-described instructions are inputted. Simultaneously with the switching operation from the transferred plasma arc to the non-transferred plasma arc, the moving speed of the plasma torch is varied in accordance with a change from the transferred plasma arc current to the non-transferred plasma arc current. The transferred plasma arc current is reduced. Simultaneously with this instruction for reducing the current, the moving speed of the plasma torch in accordance with the reduction in the current is varied. The voltage detecting function is kept in the off state during the cutting operation from the start of the cutting operation (step 51), and at a position immediately before the cutting finishing point 22 and in the vicinity of the crossing point 23 of the cutting lines, the above-mentioned function is actuated. The plasma arc current interrupting function is kept in the off state during the cutting operation from the start of the cutting operation (step 51), and at a position immediately before the cutting finishing point 22 and in the vicinity of the crossing point 23 of the cutting lines, the above mentioned function is actuated. The above-described instructions can be inputted so as to obtain a cutting surface of good quality. The instructions can be combined with each other and inputted as required. With the NC plasma cutting apparatus, by application of the above-discussed program, automatic cutting processing to satisfy demands of various types of cutting qualities and cutting speeds can be achieved, thus eliminating the need for complicated and troublesome operations and improving productive efficiency.

INDUSTRIAL APPLICABILITY

The present invention is useful as a plasma cutting apparatus and a plasma cutting method in which an improvement can be made in the quality of a bore-cut product by use of a transferred plasma arc, and also, the productive efficiency can be enhanced.

We claim:

1. A method for utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch comprising an electrode and a nozzle, said method comprising the steps of:

generating a transferred plasma arc current between said electrode and said cutting starting point on the workpiece, using said transferred plasma arc current to effect cutting of said workpiece along said cutting line beginning from said cutting starting point, terminating said transferred plasma arc current and generating a non-transferred plasma arc current between said electrode and said nozzle when the cutting of the workpiece reaches a position on said cutting line which is before said cutting finishing point and in the vicinity of said crossover point, and using said non-transferred plasma arc current to cut said workpiece along said cutting line from said switching point to said cutting finishing point.

2. A method in accordance with claim 1, wherein there is a speed of relative movement between said plasma arc torch and said workpiece during the cutting of said workpiece, further comprising varying said speed in accordance with a change from said transferred plasma arc current to said non-transferred plasma arc current at said position.

3. A method in accordance with claim 1, wherein there is a speed of relative movement between said plasma arc torch and said workpiece during the cutting of said workpiece, further comprising reducing said speed upon a change from said transferred plasma arc current to said non-transferred plasma arc current at said position.

4. A method for utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch comprising an electrode and a nozzle, said method comprising the steps of:

generating a transferred plasma arc current between said electrode and said cutting starting point on the workpiece, using said transferred plasma arc current to effect cutting of said workpiece along said cutting line beginning from said cutting starting point, reducing said transferred plasma arc current when the cutting of the workpiece reaches a position on said cutting line which is before said cutting finishing point and in the vicinity of said crossover point, and using the thus reduced transferred plasma arc current to cut said workpiece along said cutting line from said position toward said cutting finishing point.

5. A method in accordance with claim 4, wherein the step of using the thus reduced transferred plasma arc current comprises using the thus reduced transferred plasma arc current to cut said workpiece along said cutting line from said position to said cutting finishing point.

6. A method in accordance with claim 4, wherein there is a speed of relative movement between said plasma arc torch and said workpiece during the cutting of said workpiece, further comprising varying said speed in accordance with the reduction of said transferred plasma arc current at said position.

7. A method in accordance with claim 4, wherein there is a speed of relative movement between said plasma arc torch and said workpiece during the cutting of said workpiece, further comprising reducing said speed upon the reduction of said transferred plasma arc current at said position.

8. A method for utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch comprising an electrode and a nozzle, said method comprising the steps of:

generating a transferred plasma arc current between said electrode and said cutting starting point on the workpiece, using said transferred plasma arc current to effect cutting of said workpiece along said cutting line beginning from said cutting starting point, when the cutting of the workpiece reaches a position on said cutting line which is before said cutting finishing point and in the vicinity of said crossover point, activating a function of detecting a voltage between said workpiece and one of said electrode and said nozzle as said workpiece is being cut, and interrupting said transferred plasma arc current when the thus detected voltage exceeds a set value.

9. A method in accordance with claim 8, wherein said function of detecting said voltage is deactivated during the cutting from said starting point to said position.

10. A method for utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch comprising an electrode and a nozzle, said method comprising the steps of:

generating a transferred plasma arc current between said electrode and said cutting starting point on the workpiece, using said transferred plasma arc current to effect cutting of said workpiece along said cutting line beginning from said cutting starting point, detecting a voltage between said workpiece and one of said electrode and said nozzle as said workpiece is being cut, and when the cutting of the workpiece reaches a position on said cutting line which is before said cutting finishing point and in the vicinity of said crossover point, activating a function of interrupting said transferred plasma arc current when the thus detected voltage exceeds a set value.

11. A method for controlling a cutting operation utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch comprising an electrode and a nozzle, said method comprising the steps of:

providing a control program having cutting information, inputting, in advance into said control program, data concerning a position on said cutting line which is before said cutting finishing point and in the vicinity of said crossover point, generating a plasma arc current between said electrode and said cutting starting point on the workpiece, using said plasma arc current to effect cutting of said workpiece along said cutting line beginning from said cutting starting point, detecting, during the cutting operation, that said position has nearly been reached by the cutting; and utilizing said control program to give an instruction, based on the result of said detecting, for modifying the cutting operation by reducing said plasma arc current.

12. A method in accordance with claim 11, wherein there is a speed of relative movement between said plasma arc torch and said workpiece during the cutting of said workpiece; and wherein the step of utilizing said control program comprises utilizing said control program to give an instruction, based on the result of said detecting, for reducing said plasma arc current and for giving an instruction for varying said speed in accordance with the reducing of said plasma arc current.

13. A method for controlling a cutting operation utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch comprising an electrode and a nozzle, said method comprising the steps of:

providing a control program having cutting information, inputting, in advance into said control program, data concerning a position on said cutting line which is before said cutting finishing point and in the vicinity of said crossover point, generating a plasma arc current between said electrode and said cutting starting point on the workpiece, using said plasma arc current to effect cutting of said workpiece along said cutting line beginning from said cutting starting point, detecting, during the cutting operation, that said position has nearly been reached by the cutting; and utilizing said control program to give an instruction, based on the result of said detecting, for modifying the cutting operation;

wherein the step of utilizing said control program comprises utilizing said control program to give an instruction, based on the result of said detecting, for switching said plasma arc current from a transferred plasma arc current to a non-transferred plasma arc current.

14. A method in accordance with claim 13, wherein there is a speed of relative movement between said plasma arc torch and said workpiece during the cutting of said workpiece; and wherein the step of utilizing said control program further comprises giving an instruction for varying said speed in accordance with the switching from said transferred plasma arc current to said non-transferred plasma arc current.

15. A method for controlling a cutting operation utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch comprising an electrode and a nozzle, and method comprising the steps of:

providing a control program having cutting information, inputting, in advance into said control program, data concerning a position on said cutting line which is before said cutting finishing point and in the vicinity of said crossover point, generating a plasma arc current between said electrode and said cutting starting point on the workpiece, using said plasma arc current to effect cutting of said workpiece along said cutting line beginning from said cutting starting point, detecting, during the cutting operation, that said position ham nearly been reached by the cutting; and utilizing said control program to give an instruction, based on the result of said detecting, for modifying the cutting operation;

wherein the step of utilizing said control program comprises utilizing said control program to give an instruction, based on the result of said detecting, for activating a voltage detecting function, which prior thereto during the cutting operation had been kept in an off state.

16. A method in accordance with claim 15, wherein the voltage detecting function comprises detecting a voltage between said workpiece and one of said electrode and said nozzle as said workpiece is being cut, and interrupting said plasma arc current when the thus detected voltage exceeds a set value.

17. An NC plasma cutting apparatus for controlling a cutting operation utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch having an electrode and a nozzle, said apparatus comprising:

a control program having cutting information;

means for inputting, in advance into said control program, data concerning a position on said cutting line before said cutting finishing point and in the vicinity of said crossover point;

said plasma arc torch for generating a plasma arc current to effect cutting of said workpiece along said cutting line;

means for detecting, during the cutting operation, that said position has nearly been reached by the cutting; and means for giving an instruction, based on the result of said detecting, for controlling the cutting operation;

wherein said means for giving an instruction gives an instruction, based on the result of said detecting, for switching said plasma arc current from a transferred plasma arc current to a non-transferred plasma arc current.

18. Apparatus in accordance with claim 17, further comprising means for providing a moving speed of the plasma arc torch relative to said workpiece; and wherein said means for giving an instruction gives an instruction, based on the result of said detecting, for switching said plasma arc current from a transferred plasma arc current to a non-transferred plasma arc current, and also an instruction for varying said moving speed in accordance with the switching from the transferred plasma arc current to the non-transferred plasma arc current.

19. An NC plasma cutting apparatus for controlling a cutting operation utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch having an electrode and a nozzle, said apparatus comprising:

a control program having cutting information;

means for inputting, in advance into said control program, data concerning a position on said cutting line before said cutting finishing point and in the vicinity of said crossover point;

said plasma arc torch for generating a plasma arc current to effect cutting of said workpiece along said cutting line;

means for detecting, during the cutting operation, that said position has nearly been reached by the cutting; and means for giving an instruction, based on the result of said detecting, for controlling the cutting operation;

wherein said means for giving an instruction gives an instruction, based on the result of said detecting, for reducing the plasma arc current.

20. Apparatus in accordance with claim 19, further comprising means for providing a moving speed of the plasma arc torch relative to said workpiece; and wherein said means for giving an instruction gives an instruction, based on the result of said detecting, for reducing the plasma arc current, and also an instruction for varying said moving speed in accordance with the reducing of the plasma arc current.

21. An NC plasma cutting apparatus for controlling a cutting operation utilizing a plasma arc torch to cut a hole in a workpiece by cutting the workpiece along a cutting line which extends from a cutting starting point to a cutting finishing point such that said cutting line crosses itself at a crossover point, thereby defining said hole, said plasma arc torch having an electrode and a nozzle, said apparatus comprising:

a control program having cutting information;

means for inputting, in advance into said control program, data concerning a position on said cutting line before said cutting finishing point and in the vicinity of said crossover point;

said plasma arc torch for generating a plasma arc current to effect cutting of said workpiece along said cutting line;

means for detecting, during the cutting operation, that said position has nearly been reached by the cutting; and means for giving an instruction, based on the result of said detecting, for controlling the cutting operation;

wherein said means for giving an instruction gives an instruction, based on the result of said detecting, for activating a voltage detecting function, which prior thereto during the cutting operation had been kept in an off state.

22. Apparatus in accordance with claim 21, wherein the voltage detecting function comprises detecting a voltage between said workpiece and one of said electrode and said nozzle as said workpiece is being cut, and means for interrupting said plasma arc current when the thus detected voltage exceeds a set value.

* * * * *

UNITED STATES PATENT AND TRADEMARK OFFICE
CERTIFICATE OF CORRECTION

PATENT NO. : 5,695,663
DATED : December 9, 1997
INVENTOR(S) : Toshiya Shintani, et al.

Page 1 of 2

It is certified that error appears in the above-indentified patent and that said Letters Patent is hereby corrected as shown below:

Delete drawing sheet 2 of 6 (FIGS. 3 and 4).

Column 5, line 31, delete "FIGS. 1A and 1B show" and insert --FIG. 1A is--.

Column 5, line 32, after "and" insert --FIG. 1B is a timing chart of--.

Column 5, line 37, delete "FIGS. 3A and 3B show partial timing charts" and insert --FIG.3A is a partial timing chart--.

Column 5, line 38, after "and" insert --FIG. 3B is a timing chart of--.

Column 5, line 41, delete "FIGS. 4, 4A an 4B show timing charts" and insert --FIG. 4A is a timing chart--.

Column 5, line 42, after "and" insert --FIG. 4B is a timing chart of--.

Column 5, line 66, delete "FIG. 1 is a timing chart" and insert --FIGS. 1A and 1B are timing charts--.

Column 5, line 66, delete "shows" and insert --show--.

Column 6, line 10, delete "1" and insert --1A, 1B,--.

Column 7, lines 53 and 54, delete "FIG. 3 shows one example of a timing chart" and insert --FIGS. 3A and 3B show one example of timing charts--.

UNITED STATES PATENT AND TRADEMARK OFFICE
CERTIFICATE OF CORRECTION

PATENT NO.  : 5,695,663
DATED       : December 9, 1997
INVENTOR(S) : Toshiya Shintani et al.

It is certified that error appears in the above-indentified patent and that said Letters Patent is hereby corrected as shown below:

Column 8, line 12, delete "FIG. 4 is a timing chart" and insert --FIGS. 4A and 4B are timing charts--.

Column 8, line 21, delete "4" and insert --4A, 4B,--.

Column 10, lines 33-34, delete "switching point" and insert --position--.

Column 13, line 5, delete "and method" and insert --said method--.

Column 13, line 17, delete "ham nearly been reached" and insert --has nearly been reached--.

Signed and Sealed this

Eighteenth Day of August, 1998

Attest:

BRUCE LEHMAN

*Attesting Officer*            *Commissioner of Patents and Trademarks*